US006958014B1

(12) United States Patent
Luciano, Jr. et al.

(10) Patent No.: US 6,958,014 B1
(45) **Date of Patent: *Oct. 25, 2005**

(54) LOTTERY-STYLE ON-DEMAND TICKET SYSTEM AND METHOD

(75) Inventors: Robert Anthony Luciano, Jr., Reno, NV (US); Warren Rapelye White, Reno, NV (US)

(73) Assignee: Sierra Design Group, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/642,839

(22) Filed: Aug. 18, 2003

Related U.S. Application Data

(63) Continuation of application No. 09/922,491, filed on Aug. 3, 2001, now Pat. No. 6,648,755.

(60) Provisional application No. 60/289,561, filed on May 7, 2001.

(51) Int. Cl.[7] ............................ A63F 9/24; A63F 13/12

(52) U.S. Cl. ............................ 463/17; 463/18; 463/20; 283/101; 283/903

(58) Field of Search .................... 463/17–21; 283/100, 283/101, 103, 104, 105, 903

(56) References Cited

U.S. PATENT DOCUMENTS

| | | | | |
|---|---|---|---|---|
| 4,677,553 | A * | 6/1987 | Roberts et al. | 463/17 |
| 5,941,771 | A * | 8/1999 | Haste, III | 463/17 |
| 6,543,808 | B1 * | 4/2003 | Mitchell et al. | 283/49 |
| 2002/0098882 | A1 * | 7/2002 | Lind et al. | 463/17 |

* cited by examiner

*Primary Examiner*—Andrew M. Dolinar
(74) *Attorney, Agent, or Firm*—Russ F. Marsden

(57) ABSTRACT

A distributed manufacturing and distribution process for lottery tickets is disclosed. The manufacturing/vending system comprises a centralized ticket manufacturing controller located at a centralized location and one or more vending devices located at remote sites. Each vending device is operatively coupled for communication with the centralized ticket manufacturing controller, normally via a network connection. Each vending devices is further equipped with a printer and ticket media, so that a customer is able to purchase on-demand tickets from vending device in communication with the centralized ticket manufacturing controller. Additionally, the vending devices may be configured as electronic aid to display the results of the purchased lottery tickets in entertaining ways to the customer.

55 Claims, 4 Drawing Sheets

LOTTERY-STYLE ON-DEMAND TICKET SYSTEM AND METHOD

RELATED APPLICATIONS

This application is a continuation of application Ser. No. 09/922,491 filed on Aug. 3, 2001 U.S. Pat. No. 6,648,755, which claims priority to provisional application 60/289,561 filed on May 7, 2001.

BACKGROUND OF THE INVENTION

1. Field of the Invention

This invention pertains generally to lottery-based manufacturing devices, systems, methods and electronic aids to lottery-based games. More particularly, the invention is a manufacturing and distribution system for printing "on-demand" lottery or pull-tab tickets during purchase.

2. The Prior Art

Traditional pull-tab systems utilizes paper tickets which can be "broken open" to reveal a pattern of symbols which may equate to a winning prize. The tickets are arranged into finite sets called "deals," "decks" or "draws". Each finite set has a predetermined number of tickets at various prize levels. Therefore the total price of the deck is known (since the tickets are sold for a uniform amount) and the total value of the prizes is known, so the seller of the tickets knows the total profit to be made on the sale of the deck. These decks of tickets are manufactured and printed at a central location, and put into a form usable by standard dispensing machines, typically in rolls or stacks. These rolls are then physically distributed from the central location to each vending site for dispensing. Tickets are dispensed by clerks or vending machines to customers, who peel open a layer hiding the prize contents to reveal what their winning value is, if any. Winning tickets are redeemable for the value of the win. Examples of such implementations are described in U.S. Pat. No. 5,290,033 entitled "GAMING MACHINE AND COUPONS" to Bittner, et al. and U.S. Pat. No. 5,348,299 entitled "ELECTRONIC GAMING APPARATUS" to Clapper, Jr.

There are several disadvantages associated with this prior art manufacturing and distribution method for pull-tab tickets. First, the vending sites that dispense the pull-tab tickets are required to carry sufficient inventories of rolls or stacks of tickets to provide the dispensing counter and/or dispensing devices with sufficient quantities of tickets for dispensing to purchasing consumers. Carrying such inventories exposes the site operator to substantial risk of loss due to theft.

Another primary disadvantage associated with prior art systems is that of security which arises due to the relatively easy access to the stacks or rolls of pull-tab tickets by employees of the vending sites. For example, the risk of collusion between a vending site employee and a customer may arise where the employee has access to the stacks or rolls of pre-printed tickets. In such case, the employee may attempt to selectively sell a particular customer certain tickets which the employee believes are "winners," where for example, the employee realizes that certain winning tickets are dispensed at particular intervals. Similarly, the employee may sell what the employee believes to be losing tickets to other customers, and reserve winning tickets for particular customer(s). Such practices are unfair to customers participating in the pull-tab lotteries and diminishes the trustworthiness of and player participation in such pull-tab games, thereby resulting in reduces revenue for both the pull-tab manufacturer and the vending site operator.

Several attempts have been made to implement lottery-based games in a purely or substantially electronic form (i.e., where the customer is not provided a printed lottery ticket). Examples of such implementations are described in U.S. Pat. No. 4,494,179 entitled "AUTOMATIC LOTTERY SYSTME" to Troy, et al., and U.S. Pat. No. 5,324,035 entitled "VIDEO GAMING SYSTEM WITH FIXED POOL OF WINNING PLAYS AND GLOBAL POOL ACCESS" to Morris, et al. While these implementations provide "on-demand" play of lottery games in electronic format, traditional customers of paper pull-tab games do not find the electronic implementations as fun or exciting. In some cases, players of electronic versions of pull-tabs have a distrust for the electronic format of the game, some indicating a fear that the computer which manages the game is "cheating."

Furthermore, these purely electronic or substantially electronic implementations are also considered "electronic facsimiles" of lottery games which fall out of the gambit of Class II Indian gaming devices as is known in the art and as is represented by current federal case law. Accordingly, such implementations require vending site operators to enter into a compact with the state of jurisdiction before implementing such lottery games in electronic form. Establishing such compacts is sometimes time consuming and often fails to be negotiated to fruition due to disagreements about terms, among other things. Additionally, under a compact the vending site operator is required to pay the state of jurisdiction a fee resulting in decreased revenue for the vending site operator. Lottery-based devices implemented as "electronic aids," however, may be operated in a jurisdiction without the requirement of a compact and would thereby ease implementation by a prospective vending site operator.

Prior art printing systems are described in U.S. Pat. No. 4,677,553 entitled "SECURE PLACEMENT OF CONFIDENTIAL INFORMAITON ON A CIRCULATED BLANK TICKET" and U.S. Pat. No. 5,772,510 entitled "LOTTERY TICKET AND SYSTEM." In each of the above implementations, the ticket media is distributed, either to potential customers or clerk operators. As described in the U.S. Pat. No. 5,772,510 patent, the prior distribution or supply of ticket media to potential customers allows the player the player to choose one of a plurality of lottery ticket types. The player must choose a game type by selecting the appropriate ticket media, and insert the ticket media into the machine for printing thereon. As is known in the art, a primary disadvantage of such ticket media distribution is that the ticket media is susceptible to tampering and/or fraud. Additionally, for each different game type, a partially completed and encoded ticket media must be provided in order to distinguish the game type requested by the patron. Such a system is particularly cumbersome for players, and potentially reduces frequency at which games are played.

Another example prior art pull-tab gaming machine is described in U.S. Pat. No. 5,580,311 entitled "ELECTRONIC GAMING MACHINE AND METHOD" to Haste. The Haste machine however is limited to printing tickets for game records stored within the machine. This arrangement is not suitable where the game records are to be distributed via a plurality of machines, and is not suitable for use in allowing multiple players to play a plurality of machines and draw from the same pool of lottery tickets. Accordingly the amusement and competition associated with playing fixed-pool games (such as lotteries) among a group of players are diminished.

The needs and concerns outlined above are also present in other lottery-based games, including state lotteries (e.g., pull-tab games, scratcher games). Accordingly, there is a need for a pull-tab manufacturing and distribution system and method which overcomes these and other disadvantages associated with the prior art by providing, among other things, on-demand printing of pull-tab tickets upon or during purchase by the customer. If desired, the present invention may be utilized as an electronic aid, although principally the present invention is utilized as a manufacturing and vending device. Under such arrangements, the risk of carrying large inventories and security breaches are substantially reduced or eliminated altogether. Furthermore, the present invention may be operated without requiring establishing a compact with the state of jurisdiction when operated either as a manufacturing and/or vending device or as an electronic aid to the pull-tab game. The present invention satisfies these needs, as well as others, and generally overcomes the deficiencies found in the background art.

BRIEF DESCRIPTION OF THE INVENTION

The present invention is a distributed manufacturing and distribution process for lottery tickets, including but not limited to pull-tab and "scratcher" tickets. In general, the manufacturing/vending system comprises a centralized ticket manufacturing controller located at a centralized location and one or more vending devices, usually located at remote sites. Each vending device is operatively coupled for communication with the centralized ticket manufacturing controller, normally via a network connection. In alternative embodiments, the centralized manufacturing controller and vending devices may be located at the same location.

The manufacturing/vending system further comprises one or more ticket pools. The ticket pools are generally derived by or generated by the centralized ticket manufacturing controller and comprises a plurality of lottery-based tickets. Normally the ticket pools are stored on electronic storages, such as memory or a database either resident in the centralized ticket manufacturing controller or in communication with centralized ticket manufacturing controller. Ticket pools may be kept for multiple type of games or game themes as well as multiple ticket pools for each game or game theme.

Each vending device comprises a printer and the printing process is now located at each individual vending points (can be remote or local sites) rather than at a centralized location. Instead of printing the tickets at the centralized site, the tickets are printed on-demand by the vending device upon purchase by a customer. This provides the vending site the ability to provide on-demand purchase of lottery-style tickets such as pull-tab tickets without carrying substantial inventories of stacks or rolls of pre-printed pull-tab tickets. Such an arrangement also makes collusion between vending site employees and purchasers more difficult to carry out.

In an illustrative embodiment of the present invention, the vending devices comprise counter service stations, each operated/tended by a clerk or attendant where each ticket sold by the attendant to a customer is dynamically printed upon a purchase request by the customer.

According to another aspect of the invention, each vending device may further be configured as a pull-tab electronic aid (as used in the present disclosure, "pull-tab", "pull-tab ticket", "scratcher" and similar descriptions are understood to include any lottery-style game where a game result indicator is enabled to be printed on a ticket receivable by a player such that the game result indicia is hidden from view until a player removes on opaque covering on the ticket, if the player chooses to be issued a ticket or must be issued a ticket). An electronic aid allows a customer to view the result of a purchased ticket in an electronic or electromechanical format. In this arrangement, the vending device further comprises a display device, such as a video monitor, LCD display or electromechanical reel system, to display the pull-tab ticket result to the customer. Typically, a game theme will be used to present the ticket result in an interesting way to the customer. The display may show symbols corresponding to the game theme according to one or more paylines or payout arrangement layouts.

As used in this disclosure "game indicia" or "game result indicia" and similar phrases indicating a game result embodied in an indicator, are used to include any type of direct or indirect connection or representation of a game result. An example of a direct representation would be a game outcome or result that is a dollar amount of a win, and the game indicia being a numerical representation of that amount. An example of an indirect representation is a game outcome representing an amount won or a prize that was won, and the game indicia being a set of symbols (such as three cherries in a line) that, by way of lookup by the player, correspond to the game outcome (have the same resulting value). Many variations of the above examples will come to mind of a person having skill in the gaming arts and having the benefit of the present disclosure. All such variations are within the inventive scope of the present invention.

In one of the preferred embodiments, the result display process occurs during the process of printing the pull-tab ticket so that the display process is completed after the printing process is completed. In other embodiments, the display process occurs after reading transaction data (e.g. a bar code) which has been printed on the pull-tab ticket, where the display presented correlates to the transaction data which has been read from the pull-tab ticket.

According to another aspect of the invention, the vending device may be configured to dispense a plurality of pull-tab games on a single printed pull-tab ticket. In conjunction with printing each pull-tab game on a single printed pull-tab ticket, the vending device further may also be used to display each pull-tab game result in an electronic or electromechanical format as described above operating as a pull-tab electronic aid.

The invention further relates to machine readable media on which are stored embodiments of the present invention. It is contemplated that any media suitable for retrieving instructions is within the scope of the present invention. By way of example, such media may take the form of magnetic, optical, or semiconductor media. The invention also relates to data structures that contain embodiments of the present invention, and to the transmission of data structures containing embodiments of the present invention.

Further aspects and advantages of the invention will be brought out in the following portions of the specification, wherein the detailed description is for the purpose of fully disclosing the preferred embodiment of the invention without placing limitations thereon.

BRIEF DESCRIPTION OF THE DRAWINGS

The present invention will be more fully understood by reference to the following drawings, which are for illustrative purposes only.

DETAILED DESCRIPTION OF THE PREFERRED EMBODIMENTS

Persons of ordinary skill in the art will realize that the following description of the present invention is illustrative only and not in any way limiting. Other embodiments of the invention will readily suggest themselves to such skilled persons having the benefit of this disclosure.

Figure 1:
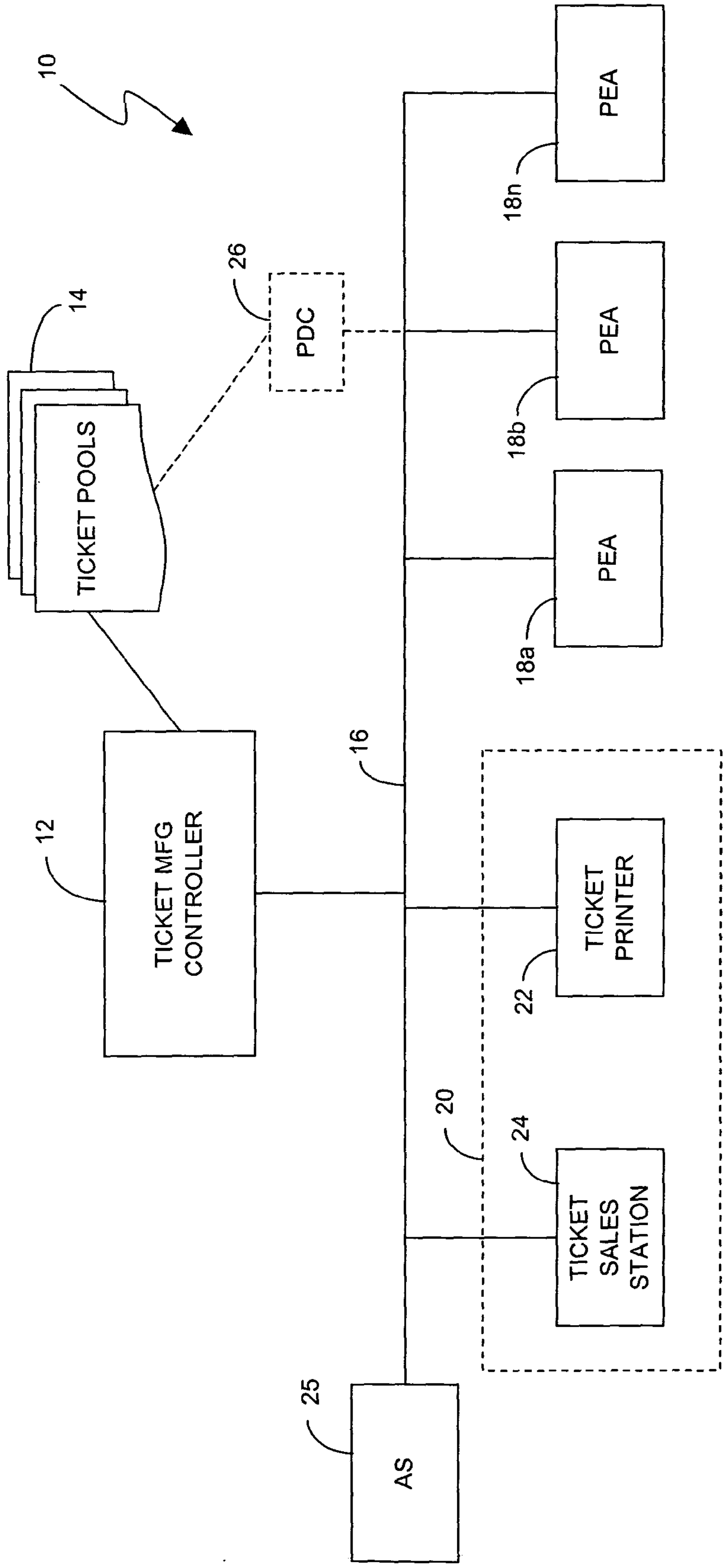
FIG. 1 is a functional block diagram of a lottery based ticket manufacturing and distribution system in accordance with the present invention.
Figure 2:
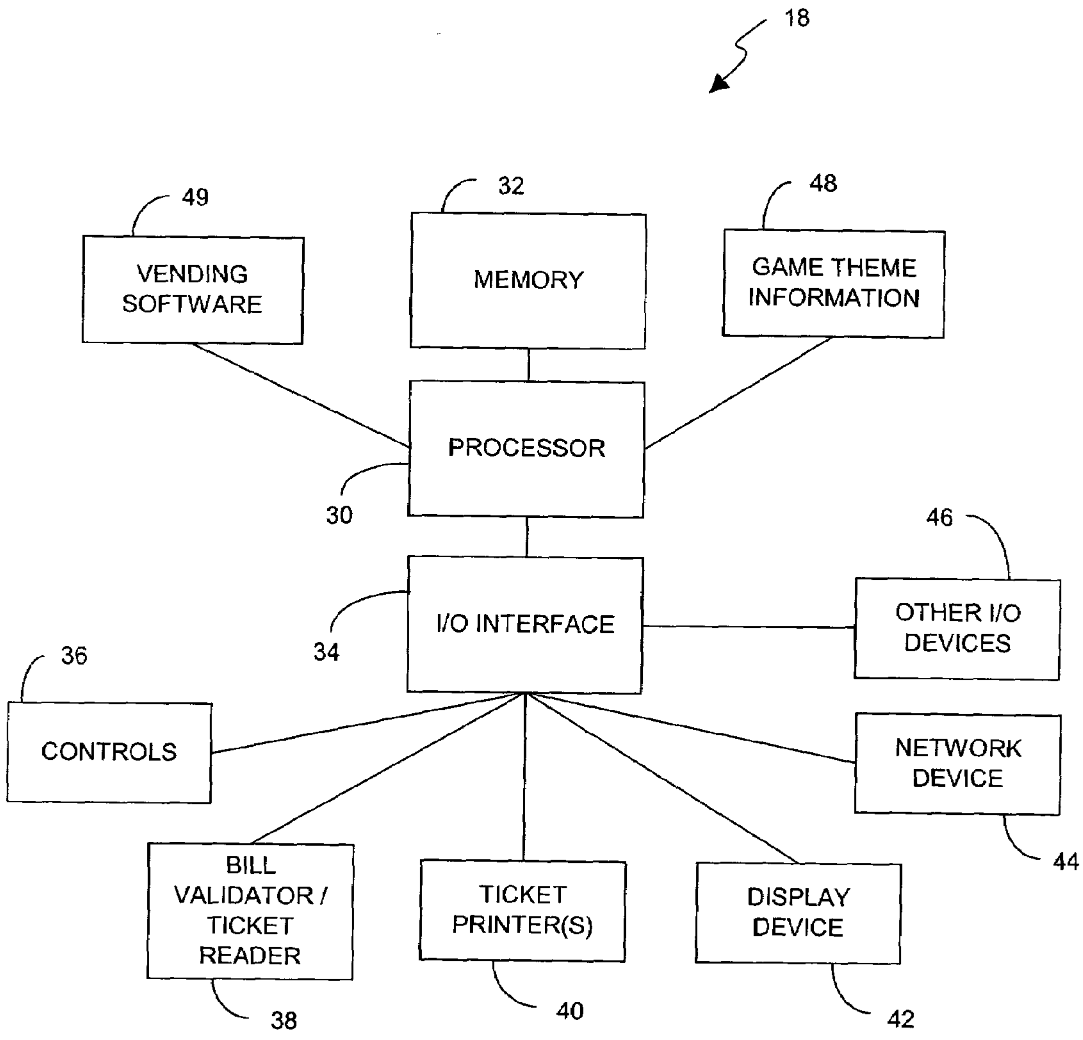
FIG. 2 is a functional block diagram depicting an example vending device/pull-tab electronic aid in further detail.
Figure 3:
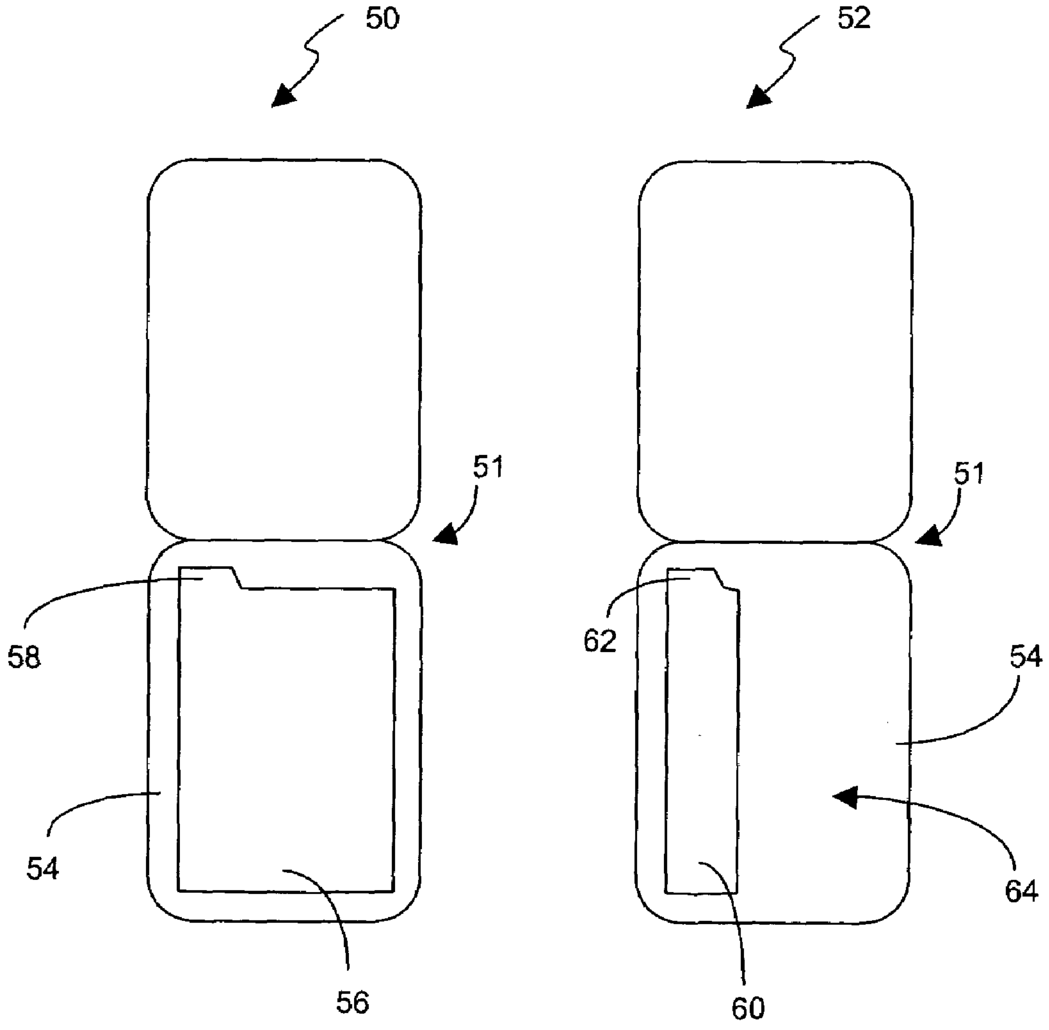
FIG. 3 is depicts two sample lottery-based ticket media suitable for use with the present invention.
Figure 4:
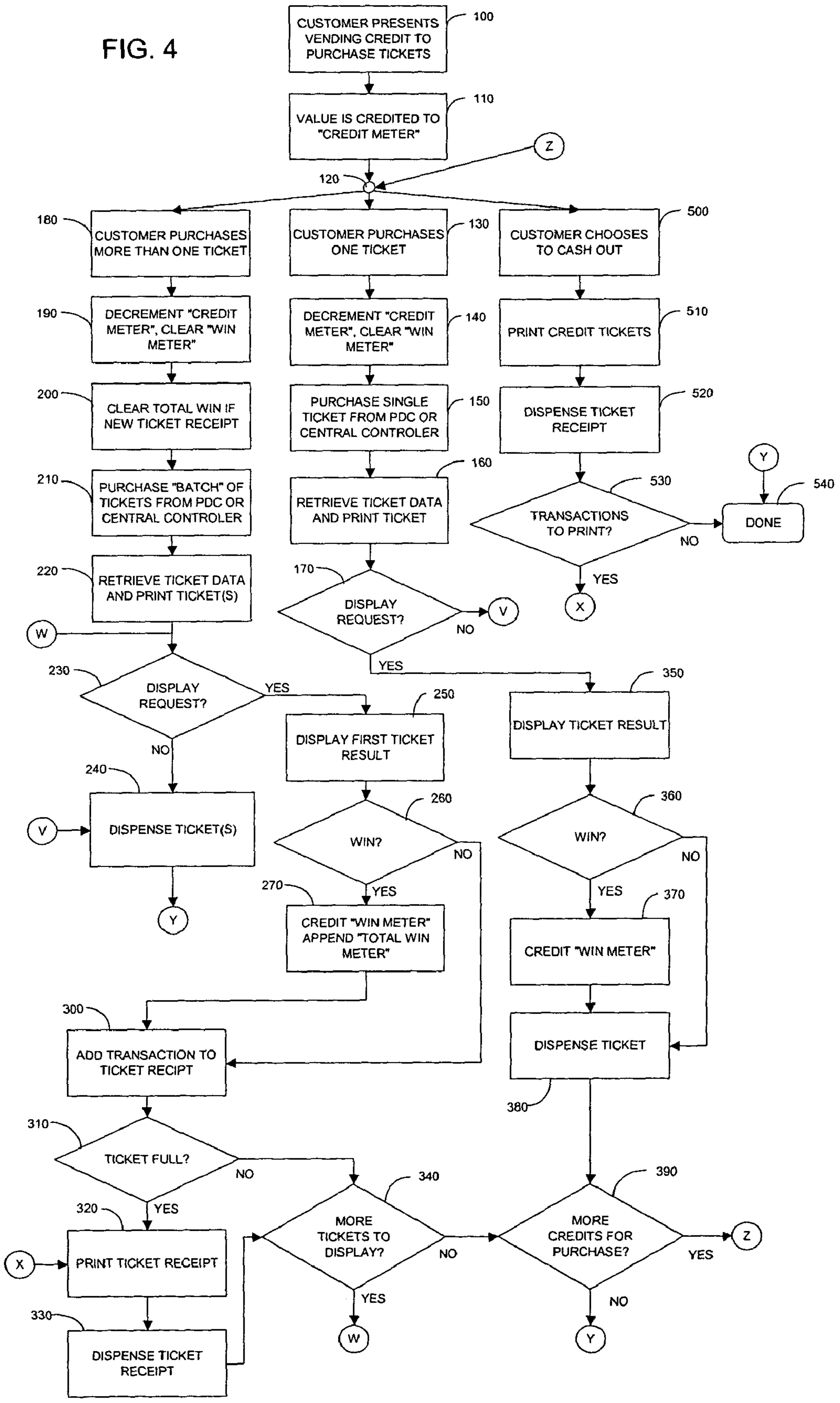
FIG. 4 is a logical flow diagram depicting and example vending process in accordance with the present invention

Referring more specifically to the drawings, for illustrative purposes the present invention is embodied in the apparatus shown FIG. 1 through FIG. 3 and the method outlined in FIG. 4. It will be appreciated that the apparatus may vary as to configuration and as to details of the parts, and that the method may vary as to details and the order of the acts, without departing from the basic concepts as disclosed herein.

Referring first to FIG. 1, there is shown a functional block diagram of a lottery based ticket manufacturing and distribution system (LTMDS) 10 in accordance with the present invention. LTMDS 10 comprises a centralized ticket manufacturing controller (CTMC) 12 operatively coupled for communication with one or more ticket pools 14. The LTMDS 10 is centrally located and is operatively coupled to a network 16 for communication to devices located at one or more local sites.

The devices at the local sites include one or more lottery-based vending devices, generally referred to herein as pull-tab electronic aids (PEA) 18*a* through 18*n* and/or a counter service station 20 normally tended by a clerk, or any combination thereof, each coupled for communication to the network 16. The counter service station 20 generally comprises a ticket printer device 22 and a ticket sales/redemption station 24. An automated service station (AS) 25 may also be provided to provide the functionality of the counter service station 20 to a customer without the requirement of an attendant or clerk. Each of the devices (18, 20, 25) at the local site is operatively coupled for communication with the CTMC 12 via network connection 16.

According to some embodiments as optionally depicted in FIG. 1, the local site may further comprise one or more pull-tab distribution controllers (PDC) 26 operatively coupled for communication to the network 16. Where a PDC 26 is implemented at a local site, the PDC 26 is operatively coupled for communication to each PEAs 18*a* through 18*n* and/or counter service station 20 and AS 25. Additionally, the PDC 26 is operatively coupled for communication to the ticket pools 14, or actually contains one or more ticket pools 14 within a storage space or memory managed by the PDC 26. The ticket pools 14 are typically generated by the CTMC 12, but may be periodically communicated/transmitted to the PDC 26 to supplement/replenish the ticket pools maintained by the PDC 26. For example, the CTMC 12 may supplement a ticket pool maintained by the PDC 26 when the number of tickets within a particular pool reaches or drops below a certain threshold.

The CTMC 12 may be coupled to the ticket pools 14 or may be the repository for the ticket pools 14 within a storage space or memory managed by the CTMC 12. Ticket pools 14 may be kept for multiple types of games or game themes, as well as multiple ticket pools for each game or game theme. According to some embodiments, the function carried out by the CTMC 12 may be carried out by a plurality of devices or a plurality of CTMC 12, each managing different pools to thereby spread the workload across multiple devices and provide more robust performance of the LTMDS 10.

The CTMC 12 generally comprises a computer or conventional data processing device having a network interface appropriate to the type of local or wide-area network 16 being used. As such, CTMC 12 generally includes such hardware components (not shown) as a processor, memory and input/output interfaces and devices suitable for carrying out the functions of the CTMC 12 as described herein.

The CTMC 12 further comprises other input/output (I/O) devices, such as a keypad for entry of security codes, a display to show status and diagnostic information, and high security keylock switches to enable access to secure information or to allow control of critical activities, such as opening or closing pools, for example. According to one embodiment, the CTMC 12 utilizes the QNX Operating System. For additional security, the CTMC 12 may be enclosed in a secure steel housing, with alarm detectors, and further requiring keyed access to its contents.

One or more ticket pools 14 may be derived or generated by the CTMC 12 or other data processing devices (not shown). Once generated, the ticket pools 14 may reside in a database (not shown) in operable communication with the CTMC 12 and/or the PDC 26. Alternatively, individual ticket pools 14 may be resident in the CTMC 12 and/or the PDC 26, generally in a storage space or memory. The process for electronically generating fixed pool tickets from a desired winning distribution or "template" are well know in the art, and the present invention anticipates the usage of various implementations, processes, and winning distributions as suitable for generating ticket pools 14.

Network 16 allows messages to be transmitted between the CTMC 12 at the centralized location and the local devices (18*a* through 18*n*, 20 and 25) at each local site. The network 16 can take various forms, including ethernet using one of several standard protocols, such as TCP/IP. According to some embodiments, the local network connecting local devices and PDC 26 may be a serial, multi-drop protocol of either a general-purpose or specific purpose nature.

The description provided herein for the local devices is suitable for an implementation at a local site, although the present invention is also suitable for use with multiple local sites, the description of the local devices herein applicable to such multiple local sites.

Referring now to FIG. 2, as well as FIG. 1, there is shown a functional block diagram depicting in further detail an example PEA 18 in accordance with the present invention. PEA 18*a* through 18*n* of FIG. 1 are generally structured and configured as PEA 18 as described herein, although the PEA 18 may comprise various forms and include varying components and carry out functions in accordance with the desired implementation.

Typically a PEA 18 will accept currency (cash monies) or other forms of vending credit from a customer/consumer. Other vending credit forms include voucher or cashless tickets, tokens, electronic accounts (such as player accounts, bank accounts, credit account, etc.) accessed via bearing instruments such as magnetic or smart cards or accessed via a personal identification number (PIN). Once a customer has established vending credit, the customer is able to purchase one or more lottery based tickets in a dynamic or "on-demand" manner, not previously available. The operation of vending on-demand lottery based tickets are described in further detail below.

The PEA 18 generally comprises conventional hardware components such as a processor 30 coupled for communication with a memory 32 and an I/O interface 34. The I/O interface 34 is further coupled for communication with a plurality of I/O devices including game controls 36, a bill validator/ticket reader 38, one or more ticket printers 40, a display device 42, a network device 44, and other I/O devices 46. Vending software 49 normally provided in a memory (e.g., EPROM) provides the programming executed by the processor for carrying out the vending functions described herein.

The controls 36 generally comprise input buttons, switches, touch-screen controls, and/or other input controls to allow a customer to provide game input to the PEA 18 such as customer options, selections, game commands, among others. The bill validator/ticket reader 38 receives vending credit or information bearing instruments from the customer such as currency, voucher or ticket credits for usage with the PEA 18.

The ticket printer(s) 40 provide output to the customer, generally in the form of a printed ticket. As described further below, the ticket printer 24 is used to print a lottery-based ticket on demand (i.e., at the time of purchase) using lottery ticket media in accordance with the present invention and ticket information from the CTMC 12 (or PDC 26). In the preferred embodiment, the lottery ticket media is secured and generally inaccessible to potential customers. This printing capability is provided at the local site, rather than at the central site, thereby providing the final distribution point for tickets locally which otherwise would have been printed and distributed from the central site.

According to one of the preferred embodiments, a first thermal printer may be provided to print onto thermal media (i.e., lottery ticket media in this case) through an opaque cover. Portions of the ticket may be covered by the opaque cover to conceal information, such as game symbols, or game outcomes, for example. Other portions of the ticket need not be covered by the opaque cover for such information as a "bar-code" corresponding to the ticket purchase transaction (e.g., draw or ticket transaction ID, ticket session ID, purchase session ID which are described below). Thus the thermal printer may be used to print information on the thermal media, some of which (e.g., game symbols, amount of win) being covered by an opaque cover, some of which (e.g., transaction information) is not covered. The ticket information printed on the thermal media is dynamically obtained by the PEA 18 from the CTMC 12 or the local PDC 26 at the time of purchase.

According to another preferred embodiment, a second printer may also be provided to print additional data (e.g., game theme information) onto the lottery-based ticket which is dispensed to the customer. For example, the second printer may comprise an inkjet, laser, or dye-based printer to print game theme information onto the opaque cover or other uncovered areas of the ticket. This arrangement is particularly advantageous where a PEA is used to service multiple game themes to thereby allow the PEA to dynamically print the relevant game theme and/or graphics onto the purchased ticket. The game theme information printed on the ticket is generally provided by module 48 (depicted in FIG. 2) which contains the requisite information for generating ticket graphics, logos, and other indicia. Game theme information module 48 is generally provided in a memory (such as an EPROM) and is accessed by the processor 30 for generating the printed ticket during operation.

In other embodiments, a second printed need not be provided where, for example, the ticket or opaque cover is pre-printed with game theme or graphics. This arrangement is useful where the PEA is used to service a single game theme, for example.

The display device 42 generally comprises a monitor or other video output device (e.g., LCD panel) for communicating ticket advertising, purchase and result output information to the customer. The output display of the display device 42 may relate to a game or game theme, the information of which is provided by the game theme information module 48. For example, when the PEA 18 is requested to display the ticket result by a customer, the relevant display information (e.g., reels, cards, dice, or other game theme data, graphics, sound or animation) is obtained from the game theme information module 48 by the processor for output to the display device 42. In alternative embodiments, an electromechanical display may be used to display the ticket result. For example, a set of electromechanical slot reels controlled by the processor 30 may be used to display the corresponding ticket result for a purchase where the game theme comprises a "slot-based theme."

The network device 44 generally comprises a communication device, such as a network card or serial device, for communicating with the CTMC 12 or PDC 26 or with other network devices (e.g., back-end servers) via the network 16. As shown in FIG. 2, other I/O devices 46 may also be provided, such as speakers, lights, alarms, etc.

As noted above, according to one embodiment of the PEA 18, the PEA 18 may provide an electronic or electromechanical display of the lottery-based output (e.g., ticket symbols, amount won) either in conjunction with or in substitution for the printed ticket, based on the customer's election. If the entertainment display is a reel-based game as described above, then one embodiment will show the player spinning reels first, followed by the reels in a stopped position such that the payline(s) of the simulated reel game fall on a set of reel symbols (game symbols) having the same value as the lottery game result, which is the same value which will be printed on a lottery ticket. The slot reel animated display may visually display the reels in a stopped position before, during, or after a lottery ticket is printed. Other embodiments of the entertainment display include simulated poker games, simulated keno games, or simulated bingo games, where the visual display ends up showing a set of symbols from the applicable game that correspond to the amount won. In the preferred embodiment, a printed ticket (or printed transaction) is generated for each ticket purchase. However, where permitted in a jurisdiction, the PEA 18 may be used to generate only an electronic or electromechanical display of the lottery-based output in accordance with an alternative embodiment of the present invention.

According to another embodiment of the PEA 18, the printed ticket may be re-inserted to the PEA 18 and read by the bill validator 38 for redemption of any win amounts and for usage of the win amounts as vending credit for additional ticket purchases. In this case, the PEA 18 also functions as a redemption machine for redeeming the winnings of the ticket. The acts associated with redemption and verification of lottery tickets is well known in the art and generally comprises verifying the transaction associated with the lottery ticket. For example, the bar-code(s) indicating the transaction(s) of the lottery-ticket may be verified against a transaction database to confirm its authenticity and the win amount(s) associated with the transaction(s). In other cases, the transaction information on the bar-code corresponding to the transaction may be "self-authenticating." That is, the ticket may be self-validating without verifying the information against a transaction database. Once verified or authenticated, the win amount(s) may be established as vending credit for usage in purchasing additional lottery-based tickets on the PEA 18.

According to one of the preferred embodiments of the PEA 18, a lottery-based output (ticket) is generated for each purchase. That is for each purchase, the PEA dispenses an individual lottery ticket. In general, the ticket will contain such information as transaction information or identification (ID) and transaction/ticket result. The transaction information is generally represented as a bar-code and/or human readable information on the ticket. The game result information may be indicated by game theme indicia and/or win amounts.

According to a second preferred embodiment of the PEA 18, a plurality of lottery-based purchase transactions may be printed on a single ticket or ticket receipt, as space on the ticket permits. In this case, each transaction may be uniquely identified on the ticket (e.g., transaction identifier associated with a transaction result for each transaction). Alternatively, a plurality of transactions may be associated with a "ticket session," where the ticket session indicated on the printed ticket while the transactions associated with the session are maintained electronically on a back-end transaction server, so that the ticket, when later presented for redemption, may be verified against each transaction associated with the identified session on the printed ticket.

According to another embodiment of the PEA 18, multiple ticket purchases may be made in one "purchase session." At the completion of the purchase session, one or more tickets may be printed that includes all purchases made during the purchase session. Examples of when a purchase session is completed include the exhaustion of a customer's vending credits and the indication of completion by the customer (e.g., pressing an "end of purchase" or "cash out" button).

According to another alternative embodiment of the PEA 18, upon purchase, the PEA 18 may print a "voucher" which the customer may exchange for a lottery-based ticket at a counter service station 20 or AS 25. The "voucher" is not the lottery-based ticket, per se, but is useful for obtaining the purchased lottery-based ticket.

Referring again to FIG. 1, the counter service station 20 is structured and configured to vend on-demand lottery-based tickets in a substantially similar manner as described above for the PEA 18, but is generally tended by a clerk or attendant. The counter service station includes one or more ticket printer(s) 22 and a ticket sales/redemption station 24. The ticket printer(s) 22 comprises one or more printers capable of printing a lottery-based ticket (e.g., a pull-tab ticket) suitable for redemption and is generally structured and configured as described above for ticket printer(s) 40. Since counter service station 20 generally provides vending for a plurality of game themes, printer 22 generally comprises a first thermal printer for printing transaction information onto a thermal media and a second printer for printing additional ticket information (e.g., game theme information) either onto the thermal media or an opaque cover, which covers some or all of the printed ticket. Alternatively, the second printer need not be provided where the pre-printed media and/or opaque covers are used. As noted above, this printing capability is provided at the local site, rather than at the central site, thereby providing the final distribution point for tickets at the local level which otherwise would have been printed and distributed from the central site.

According one basic embodiment of the invention, the system 10 may simply include a CTMC 12 coupled to at least one counter service station 20 via network 16. In this embodiment, PEA 18*a* through 18*n* are not provided and customers must purchase lottery tickets from attendants operating the counter service station 20. As noted above, one advantage provided in this environment is the ability to vend "on demand" lottery tickets to customers without maintaining ticket inventories.

The ticket sales/redemption station 24 is typically operated by a clerk assisting a customer for the purchase and/or redemption of lottery-based tickets. In a case of a purchase, the clerk receives payment from the customer and generates a lottery-based ticket via ticket printer 22. In the case of redemption, the clerk receives a lottery-based ticket or voucher from the customer, the value of ticket being determined by the ticket sales/redemption station 24 and payment (e.g., cash, additional tickets) made to the customer according to the determined value of the presented lottery ticket. Normally the ticket sales/redemption station 24 includes a reader for reading the ticket to determine its value (either directly from the ticket or from a back-end transaction server (e.g., from CTMC 12 or other database)).

According to another embodiment of the present invention, the AS 25 is provided. The AS 25 is structured and configured substantially as the counter service station 20 (comprising ticket sales station coupled to a ticket printer 22) to allow the customer to interact directly with the ticket printer 22 and the ticket sales/redemption station without clerk intervention. The functions normally carried out by a clerk are embodied in programming executed by a computer (not shown) operatively coupled for communication with both the ticket printer 22 and the ticket sales/redemption station 24 in the AS 25. The computer further comprises input/output devices (e.g., keyboard, touch-screen display, video monitor) for operatively interfacing and transacting with the customer.

According to some embodiments, one or more PDC 26 is located at the local site and is operatively coupled to the other local devices (18*a* through 18*n* and 20). The PDC 26 generally carries out the functions of the CTMC 12 at the local site by providing lottery ticket data on demand to purchasing customers. The ticket pools 14 are generally resident at the individual PDC 26. In other embodiments, the ticket pools 14 are generated by the CTMC 12 and then transferred to the individual PDC 26. As purchases are made by customers, the number of tickets maintained by the PDC 26 are depleted over time. According to the preferred embodiment, a ticket pool maintained by the PDC is supplemented when the number of un-played tickets within the ticket pool drops below or reaches a predetermined threshold number. For example, a ticket pool may be supplemented when the number of un-played tickets in the pool reaches half of a full ticket pool.

Referring now to FIG. 3, two sample lottery-based ticket media 50, 52 suitable for use with the present invention are shown. Media samples 50 and 52 as described herein are suitable for use with thermal printers according to the preferred embodiment, although other media types would be appropriate depending on the type of printers implemented in the PEA 18.

Each segment of lottery ticket media is perforated at 51 from its adjacent ticket segment. Each segment of ticket media 50 comprises thermal media 54 and an opaque cover 56. The opaque cover 56 may be inherently opaque to conceal information on the thermal media 54 which it covers, or may be transparent/translucent but made opaque by printing information, game graphics, or other indicia thereon during the printing process to thereby conceal information on the thermal media 54 which it covers. The opaque cover 56 is removably attached to the thermal media 54, normally via a thermally conductive adhesive so that a thermal printer is able to print onto the thermal media 54 through the opaque cover 56. The opaque cover 56 further comprises a "tab" portion 58 integral therewith which is not attached to the thermal media 54, so that a user is able grasp the opaque cover 56 via the tab 58 to detach the opaque cover 56 from the thermal media 54.

Sample media 52 also comprises thermal media 54 and an opaque cover 60 removably attached to the thermal media 54 to conceal information which it covers. The opaque cover includes a tab portion 62 which is integral with the opaque cover 60 but not attached to the thermal media 54. The opaque cover 60 does not cover the entire thermal media 54 so that an uncovered portion 64 is not concealed by the opaque cover 60. The uncovered portion 64 may be used for printing information, game theme, and other indicia directly thereon. It is noted that sample media segments 50 and 52 are only illustrative and other arrangements of ticket printing media are equally suitable for use with the present invention.

The resulting printed ticket using media 50 or 52 is dispensed to the customer as a pull-tab lottery ticket. The customer is able to remove the opaque cover 60 to reveal the game results printed underneath. If the ticket is a "winning ticket" the customer is able to redeem the ticket for the win amounts, normally at the customer service station 20, or alternatively at the AS 25 or directly on the PEA 18 as described above.

Example thermal transfer laminate suitable for use as transparent covers are described in U.S. Pat. No. 6,228,486 entitled "THERMAL TRANSFER LAMINATE" to Kittel, et al., which allows printing through a transparent laminate to an underlying surface to provide protection of the underlying surface against abrasion and other environmental contaminants. The need for a transparent or clear laminate in such an application is evident in Kittel—namely to provide visibility of the underlying surface. According to the present invention, the need for an opaque laminate is desired to conceal the contents of any underlying surface of the lottery ticket until the customer peels of the cover, as described above, thereby revealing the contents of the underlying surface. Thus the present invention anticipates use of an opaque thermal transfer laminate or the transparent thermal laminate of the Kittel patent and further providing printing thereon (e.g., inkjet, laser, dye or other printing) to convert the transparent cover to an opaque cover.

Other ticket production techniques are also anticipated for use with the present invention. For example, instead of using thermal printers onto thermal media, conventional laser or inkjet printers may be used to print ticket information on non-thermal ticket media. Thereafter, a cover having a pull-tab portion may be attached to the ticket using an adhesive to conceal certain portions of the ticket (or removable "scratcher" material may be deposited onto the printed ticket). The resulting ticket may be dispensed to the customer as the purchased pull-tab (or scratcher) lottery ticket.

The method and operation of invention will be more fully understood with reference to the logical flow diagrams of FIG. 4, which depicts sample vending processes associated with the PEA 18, as well as FIG. 1 through FIG. 3. The order of actions as shown in FIG. 4 and described below is only illustrative, and should not be considered limiting.

In operation, the CTMC 12 (or PDC 26) maintains an array of data for each lottery based ticket pool 14 that it is responsible for. Each ticket in the ticket pool 14 has a prize value (in credits or units of currency) and a number of occurrences. Upon purchase of a ticket by a customer from a PEA 18 or service station 20, the CTMC randomly withdraws one ticket from the ticket pool 14 and withdraws the ticket from the available selection of tickets from that ticket pool. This process continues until the ticket pools being drawn has no more available tickets for withdrawal. At this point, a new lottery-based ticket pool will be initialized from a master template corresponding to the present pull-tab game.

At block 100, the customer presents "vending credit" to the PEA 18 (or counter service station 20) to purchase lottery-based tickets from the ticket pools 14; the vending credit is received by the bill validator/ticket reader 38 and processed by the PEA 18 (or the counter service station 20). The vending credit may come from acceptance of currency, insertion of coins, transfer of credit as a result of reading a bar-coded ticket, transfer of credit from an external amount, or any of a number of mechanisms which are common in the gaming industry, including the use of magnetic strip and "smart" cards. In the preferred embodiment, the customer either inserts currency into the bill acceptor or inserts a bar-coded ticket into the bill acceptor and the credit associated with the ticket is transferred to the PEA for vending credits (Alternatively, the customer provides the clerks with cash or other payment to establish vending credits).

At block 110, the vending credit provided by the customer is credited to a "credit meter" which indicates the established vending credit. The credit meter may be a separate display (e.g., an LED display) on the PEA 18 or may occupy a portion of the display screen on the main display device 42. Processing then continues to junction 120.

At junction 120, once the customer has established vending credits, the customer would typically have a choice of several varieties or denominations of pull-tabs from which to purchase. These choices could be presented to the customer in the form of highlighted areas on a touch screen, buttons, or both. In the preferred implementation the customer touches buttons or highlighted areas on the touch screen to select a denomination. The denomination and/or ticket choice defines a particular finite ticket pool 14 from which a ticket must be drawn. For example, there may be separate ticket pools for play denominations of $0.25, $0.50 and $0.75. According to some embodiments, the customer is able to purchase and print one lottery ticket at a time (i.e., one transaction per lottery ticket), in which case processing continues to block 130. According to other embodiments, the customer is able to purchase multiple lottery ticket transactions for printing on a single ticket, in which case processing continues to block 180. At junction 120, the customer also has the option to "cash out" in which case processing continues to block 500.

At block 130, the customer elects to purchase one lottery ticket from the PEA 18. Normally this request is indicated by the customer using the input controls 36 on the PEA 18.

At block 140, the credit meter is decremented the appropriate amount for the purchase made. In some embodiments, a "win meter" may also be provided on the PEA 18 either as a separate display or occupying a portion of the main display device 42. This "win meter" indicates the win amount (e.g., in terms of vending credits or currency value) of previously purchased lottery ticket (in the event the customer chooses to display the win amounts via the display device 42). During the current purchase, the "win meter" (if implemented) is cleared or otherwise reset. Normally this process is carried out by simply resetting the "win meter" to zero (0).

At block 150, in response to the customer's purchase request, the lottery ticket is purchased/retrieved by the PEA 18 from the CTMC 12. During this transaction, the PEA 18 (or counter service station 20) sends a message over the network 16 to the CTMC 12 (or PDC 26). The message generally contains ticket purchase information (e.g., denomination, game type) desired by the customer. The CTMC 12 (or PDC 26) selects the appropriate ticket pool and sends a result message back to the PEA 18 (or service station 20). Various security measures associated with networked transactions may be used, such as redundant messaging, during this process.

At block 160, the lottery ticket (i.e., ticket data) is received from the CTMC 12 by the PEA 18, normally in an electronic format communicated over the network 16. The return message from the CTMC 12 contains any and all information necessary for the printing of the purchased ticket. According to some embodiments, the return message may be in the form of a numerical value and/or in the form of graphic symbols or other tokens representing the ticket result. If symbols are sent then the symbols can be used to calculate the same prize amount as if the prize value had been returned. In a numerical value is sent, corresponding graphic symbols may be generated corresponding to the number value. Other transactional information, such as a transaction ID, date, time, etc., may also be provided.

Next at decision block 170, the customer is provided the option of displaying the result of the purchased ticket via display device 42. If the customer decides to view the ticket result via display device 42, processing continues to block 350. Otherwise, processing continues to block 240 (as depicted by connection V), where the purchased ticket is printed and dispensed on the lottery ticket media in accordance with the ticket data received from the CTMC 12, as described above. The dispensed lottery ticket may be "played" by the customer by removing the opaque cover to reveal the lottery ticket results. If the lottery ticket is a winning ticket the customer may redeem the ticket for the winning amount, normally at a counter service station 20 or AS 25, although in other embodiments, the customer is able to redeem the lottery ticket by presenting the ticket to the PEA 18 for redemption thereon and for usages as vending credit for additional ticket purchases.

At block 350, the customer has elected to display the ticket result from decision block 170. In the preferred embodiment, the printing process is carried out in conjunction with the display process via display device 42, so that the display process is completed at substantially the same time the printing process is completed. For example, the completion of the display process may be made contingent upon the completion of the printing process. In alternative embodiments, the printing process may be carried out first: in this case, a reader is used to determine the game outcome associated with the printed ticket (e.g., by reading the transaction identification bar code), after which the display device 42 is used to present the game outcome as determined from the printed ticket.

Additionally, the display process may be carried out in a two-step process in compliance with certain jurisdictions when so required. For example, the two-step process generally includes a first "covering" act which covers the game field or game symbols and a second "uncovering" act which uncovers or reveals the game result. Additionally, each act may be made pursuant to input commands provided by the customer. Animation, sound, lights and other interesting features may be used to "reveal" the ticket result to the customer.

Next at decision block 360, the PEA 18 determines whether the ticket result provides a win amount to the customer. If so, block 370 is then carried out; otherwise block 380 is then carried out.

At block 370, the purchased ticket results in a win amount to the customer. In this case, the customer is presented with the amount of the win, generally by indicating the win amount on a "win meter." In the preferred embodiment, the win meter, unlike the credit meter, is only for indicating the win amount and is not useful as vending credit for purchasing additional tickets; that is, the "win meter" is only an electronic aid to display the ticket's win amount and the ticket must actually be redeemed by the customer for redeeming the win amounts associated therewith.

In alternative embodiments, such as where the gaming jurisdiction allows, the amounts won by the customer are actually credited to the credit meter as vending credit for purchasing additional credits. This transfer to the credit meter may be carried out automatically or may be made pursuant to a customer's request to directly redeem the win amounts on the PEA 18.

At block 380, ticket is dispensed to the customer. As noted above, in the preferred embodiment, the ticket is printed and dispensed to the customer during the display process.

At decision block 390, the PEA 18 determines if the customer still has "vending credit" for purchase of additional tickets. If so, processing returns to junction 120 (as depicted by connection Z); otherwise, the purchasing process is completed as indicated by connection Y to block 540.

The process described herein for block 180 through 340 applies to the embodiment of the present invention which allows a customer to purchase a plurality of ticket transactions for printing on a single printed lottery ticket or ticket receipt. This embodiment is advantageous for conserving the amount of lottery-ticket media consumed during the printing process by allowing a plurality of ticket purchases to be associated with a single ticket. This process is also useful, where a customer chooses to purchase a "batch" of lottery tickets.

At block 180, the customer has elected to purchase a plurality of tickets (e.g. a batch of tickets). Block 180 is also carried out for the embodiment of the invention where a plurality of ticket transactions are printed on a single printed ticket or ticket receipt, even though the customer makes single ticket purchases. The physical limitations of a ticket may restrict the number of ticket transactions that may be printed on a single ticket or ticket receipt, although according to some embodiments, a ticket session identification on a printed ticket or receipt may be associated with an arbitrary number of transactions.

At block 190, the credit meter is decremented the appropriate amount based on the purchase made in block 180. In some embodiments, a "win meter" may also be provided on the PEA 18 either as a separate display or occupying a portion of the main display device 42. This "win meter" indicates the win amount (e.g., in terms of vending credits or currency value) of previously purchased lottery ticket. During the current purchase, the "win meter" (if implemented) is cleared or otherwise reset.

Block 200, if a "total win meter" is provided, the "total win meter" is reset if a new ticket receipt is being generated. A new ticket receipt may be generated to begin a new "ticket session" or new "purchase session" as described above. The "total win meter" may be used to display cumulative win amount(s) for the current ticket or purchase session (e.g. in the form of vending credits or currency amount), and may be a separate display on the PEA 18 or may occupy a portion of the main display device 42. According to the preferred embodiment, the total win meter is merely a display for the convenience of the customer and the amount indicated is not usable as vending credit for the purchase of additional lottery tickets directly. Rather, the customer must generally redeem his/her purchases lottery ticket for the amount associated therewith. This redemption may be done at the customer service station 20 or AS 25, or where permissible, at the PEA 18 (e.g., the printing and dispensing of the ticket to the customer, and the re-insertion of the ticket by the customer for validation and redemption of the amounts associated with the ticket). In alternative embodiments, such as where permissible in a jurisdiction, the total win meter may be redeemed for use as vending credits for the purchase of lottery ticket directly on the PEA 18 without the use of printed tickets. The conversion to vending credit may be carried out automatically (i.e., without customer request), or may be made pursuant to a customer command to redeem the winning lottery ticket amounts.

At block 210, in response to the customer's purchase request, the lottery ticket(s) is/are purchased/retrieved by the PEA 18 from the CTMC 12. During this transaction, the PEA 18 (or counter service station 20) sends a message over the network 16 to the CTMC 12 (or PDC 26). The message generally contains ticket purchase information (e.g., denomination, game type) desired by the customer. The CTMC 12 selects the appropriate ticket pool and sends one or more result messages back to the PEA 18 (or service station 20). Various security measures associated with networked transactions may be used, such as redundant messaging, during this process.

At block 220, the lottery ticket(s) (i.e., ticket data) is/are received from the CTMC 12 by the PEA 18, normally in an electronic format communicated over the network 16. The return message from the CTMC 12 contains any and all information necessary for the printing of the purchased ticket(s).

Next at decision block 220, the customer is provided the option of displaying the result(s) of the purchased ticket(s) via display device 42. If the customer elects to view the ticket result(s) via display device 42, processing continues to block 250. Otherwise, processing continues to block 240, where the purchased ticket(s) is/are printed and dispensed on the lottery ticket media in accordance with the ticket data received from the CTMC 12, as described above.

At block 240, the dispensed lottery ticket may be associated with a plurality of purchased lottery ticket transactions, as described above. The dispensed lottery ticket(s) may be played by the customer by removing the opaque cover to reveal the lottery ticket results. If the lottery ticket is a winning ticket the customer may redeem the ticket for the winning amount, normally at a counter service station 20 or AS 25, although in other embodiments, the customer is able to redeem the lottery ticket by presenting the ticket to the PEA 18 for redemption thereon and for usage as vending credit for additional ticket purchases.

At block 250, the customer has elected to display the ticket result from decision block 230. In the preferred embodiment, the printing process is carried out in conjunction with the display process via display device 42, so that the display process completed at substantially the same time the printing process is completed. Since multiple transactions may be printed on a single ticket or ticket receipt, the printing process for the present transaction is generally carried out in conjunction with the display process. As described above, the display process maybe carried out in a two-step process (e.g., cover and uncover process).

Next at decision block 260, the PEA 18 determines whether the ticket result provides a win amount to the customer. If so, block 270 is then carried out; otherwise processing continues to block 300.

At block 270, the purchased ticket results in a win amount to the customer. In this case, the customer is presented with the amount of the win, generally by indicating the win amount on the "win meter" and by appending the win amount to the "total win meter", which displays the cumulative total win amount for the current ticket or purchase session. In the preferred embodiment, the win meter and the total win meter, unlike the credit meter, are only for indicating the win amount and is not useful as vending credit for purchasing additional tickets; that is, the "win meter" and the "total win meter" are only an electronic aids to display the ticket's win amount and the ticket must actually be redeemed by the customer for redeeming the win amounts associated therewith. Block 300 is then carried out.

At block 300, the current purchase transaction is associated with the current ticket or purchase session for accumulation on the same printed ticket or ticket receipt. The purchase transaction may be associated to the current ticket or purchase session by maintaining the relationship between the purchased transactions with the current session via a conventional relationship techniques.

Next at decision block 310, the PEA 18 determines whether the current ticket or ticket has reached its physical space limitation for printing a plurality of purchased ticket transactions (i.e., "full"). If the ticket is "full", processing continues to block 320. Otherwise block 340 is then carried out.

At block 320, the printed ticket or ticket receipt in a summary form is generated. This process generally involves printing the ticket or purchase session information on the ticket or receipt. As noted above, a plurality of ticket purchases may be associated with a single ticket. Thus the printed ticket generally contains both session information and associated transaction result(s) information (e.g., transaction identification and transaction result), although as noted above, various ticket print-out arrangements are equally suitable for use with the present invention.

At block 330, the ticket or ticket receipt is dispensed to the customer. The opaque cover on the printed ticket may be uncovered to reveal the associated ticket purchase transaction results. The ticket may also be redeemed for any amounts won. Block 340 is then carried out.

At block 340, if the current ticket or purchase session includes additional tickets to display/print, processing returns to block 230 (as indicated by connection W), where the user is again presented the option of printing the additional ticket purchases. If the current ticket or purchase session does not include additional tickets to display/print, processing continues to block 390 to determine if there are additional vending credits for the purchase of lottery tickets.

The process described herein for blocks 500 to 540 may be carried out by the customer at junction 120 to "cash out."

At block 500, the customer has elected to "cash out" normally by choosing the appropriate game control from controls 36. The customer generally cashes out when the customer has completed his purchase or tickets and there still remains vending credit on the PEA 18.

At block 510, the customer is normally printed a ticket/voucher corresponding to the amount of vending credits the customer has remaining.

At block 520, the customer is dispending the printed ticket/voucher of block 510. In other embodiments, the customer may be provided the vending credits in other forms, such as currency or via an electronic account.

Next at block 530, the PEA 18 determines whether the customer has outstanding purchase transactions to print. For example, the customer may have purchased a plurality of tickets (blocks 180 through 340) but the ticket is not yet full (block 310). In this case, the customer's ticket or purchase session is made complete by the customer election to cash out, and the customer's ticket is generated as depicted in block 320 and describe above (as indicated by connection X). If there are no transactions to print, processing is complete as depicted by block 540.

Although the description above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. A method of manufacturing on-demand lottery tickets comprising:

providing a lottery game server;

generating, by said lottery game server, a plurality of lottery pool games;

providing at least one vending device, said vending device operatively coupled for communication with said lottery game server and further comprising blank lottery ticket media and a printer;

retrieving from said lottery game server ticket data responsive to a purchase request, said purchase request specifying at least one of said plurality of games, said ticket data comprising a ticket identification number and a game outcome;

generating a lottery ticket using said printer by printing said ticket identification number and game indicia, said game indicia corresponding to said game outcome, outcome onto said blank lottery ticket media generating thereby a printed lottery ticket; and, supplementing one pool of said lottery pool games when the number of un-played games within said one pool drops to a predetermined threshold value.

2. The method of claim 1, wherein said game outcome comprising an amount of a win.

3. The method of claim 1, wherein said game outcome comprises game symbols which may be compared against a pay table to determine an associated amount of a win.

4. The method of claim 1, further comprising printing a plurality of game outcome transactions on said printed lottery ticket, each of said game outcome transactions associated with a purchase request.

5. The method of claim 1, wherein said printed lottery ticket is further redeemable for a win amounts associated with said printed lottery ticket.

6. The method of claim 1, wherein said vending device further comprises a video display, said method further comprising displaying said game outcome of said printed lottery ticket via said video display.

7. The method of claim 6, wherein said displaying said game outcome is carried out during said printing of said printed lottery ticket.

8. The method of claim 6, further comprising reading said printed lottery ticket to determine said game outcome, said displaying said game outcome carried out after said reading said printed lottery ticket.

9. The method of claim 6, further comprising displaying on said display a win amount associated with said game outcome.

10. The method of claim 6, wherein said displaying said game outcome comprises:

animating spinning slot reels on said video display and stopping said animated spinning slot reels to indicate resulting game symbols corresponding to said game outcome along at least one payout line.

11. The method of claim 10, wherein said stopping said animated spinning slot reels is carried out after said printing is completed.

12. The method of claim 6, wherein said displaying said game outcome comprises displaying game symbols from one of: a poker hand, a keno game, or a bingo game.

13. The method of claim 1 wherein said at least one vending device further comprises at least one counter service station operable by an attendant for input of purchase requests, said counter service station operatively coupled for communication with said lottery game server and further comprising blank lottery ticket media and a printer.

14. A method of manufacturing on-demand lottery tickets comprising:

providing a lottery game server;

generating, by said lottery game server, a plurality of lottery pool games;

providing at least one vending device, said vending device operatively coupled for communication with said lottery game server and further comprising blank lottery ticket media and a thermal printer, where said blank lottery ticket media further comprises printing media and an opaque cover removably attached to said printing media covering at least a portion of said printing media and being thermally conductive;

retrieving from said lottery game server ticket data corresponding to a purchase request originating from said vending device, said purchase request specifying at least one of said plurality of games, said ticket data comprising a ticket identification number and a game outcome;

generating a printed lottery ticket by printing, using said thermal printer, said ticket identification number and game indicia, said game indicia corresponding to said game outcome, onto said printing media such that said game indicia is underneath said opaque cover, said printing said game indicia further comprising printing through said opaque cover onto said printing media.

15. The method of claim 14, wherein said game outcome comprising an amount of a win.

16. The method of claim 14, wherein said game outcome comprises game symbols which may be compared against a pay table to determine an associated amount of a win.

17. The method of claim 14, further comprising printing a plurality of game outcome transactions on said printed lottery ticket, each of said game outcome transactions associated with a purchase request.

18. The method of claim 14, wherein said printed lottery ticket is further redeemable for a win amounts associated with said printed lottery ticket.

19. The method of claim 14, wherein said vending device further comprises a video display, said method further comprising displaying said game outcome of said printed lottery ticket via said video display.

20. The method of claim 19, wherein said displaying said game outcome is carried out during said printing of said printed lottery ticket.

21. The method of claim 19, further comprising reading said printed lottery ticket to determine said game outcome, said displaying said game outcome carried out after said reading said printed lottery ticket.

22. The method of claim 19, further comprising displaying on said display a win amount associated with said game outcome.

23. The method of claim 19, wherein said displaying said game outcome comprises:

animating spinning slot reels on said video display and stopping said animated spinning slot reels to indicate resulting game symbols corresponding to said game outcome along at least one payout line.

24. The method of claim 23, wherein said stopping said animated spinning slot reels is carried out after said printing is completed.

25. The method of claim 19, wherein said displaying said game outcome comprises displaying game symbols from one of: a poker hand, a keno game, or a bingo game.

26. The method of claim 14 where said at least one vending device further comprises at least one counter service device operable by an attendant for input of purchase requests, said counter service device operatively coupled for communication with said lottery game server and further comprising blank lottery ticket media and a thermal printer, where said blank lottery ticket media further comprises printing media and an opaque cover removably attached to said printing media covering at least a portion of said printing media and being thermally conductive.

27. A method of manufacturing on-demand lottery tickets comprising:

providing a lottery game server;

generating, by said lottery game server, a first set of lottery pool games;

providing at least one lottery game distribution controller, said lottery game distribution controller operatively coupled for communication with said lottery game server, said lottery game distribution controller further maintaining a second set of lottery pool games, said second set corresponding to and retrieving from said first set of lottery pool games;

providing at least one vending device, said vending device operatively coupled for communication with said lottery game distribution controller and further comprising blank lottery ticket media and a printer;

retrieving from said lottery game distribution controller ticket data corresponding to a purchase request originating from said vending device, said purchase request specifying at least one of said second set of lottery pool games, said ticket data comprising a ticket identification number and a game outcome;

printing, by said printer, said ticket identification number and a game indicia, said game indicia corresponding to said game outcome, onto said blank lottery ticket media generating a printed lottery ticket thereby; and supplementing one pool of said second set of lottery pool games when the number of un-played games within said one pool drops to a predetermined threshold value.

28. The method of claim 27, wherein said game outcome comprising an amount of a win.

29. The method of claim 27, wherein said game outcome comprises game symbols which may be compared against a pay table to determine an associated amount of a win.

30. The method of claim 27, further comprising printing a plurality of game outcome transactions on said printed lottery ticket, each of said game outcome transactions associated with a purchase request.

31. The method of claim 27, wherein said printed lottery ticket is further redeemable for any win amounts associated with said printed lottery ticket.

32. The method of claim 27, wherein said vending device further comprises a video display, said method further comprising displaying said game outcome of said printed lottery ticket via said video display.

33. The method of claim 32, wherein said displaying said game outcome is carried out during said printing of said printed lottery ticket.

34. The method of claim 32, further comprising reading said printed lottery ticket to determine said game outcome, said displaying said game outcome carried out after said reading said printed lottery ticket.

35. The method of claim 32, further comprising displaying a win amount associated with said game outcome.

36. The method of claim 32, wherein said displaying said game outcome comprises:

animating spinning slot reels on said video display and stopping said animated spinning slot reels to indicate resulting game symbols corresponding to said game outcome along at least one payout line.

37. The method of claim 36, wherein said stopping said animated spinning slot reels is carried out after said printing is completed.

38. The method of claim 32, wherein said displaying said game outcome comprises displaying game symbols from one of: a poker hand, a keno game, or a bingo game.

39. The method of claim 27 where said at least one vending device further comprises at least one counter service station operable by an attendant for input of purchase requests, said counter service station operatively coupled for communication with said lottery game distribution controller and further comprising blank lottery ticket media and a printer.

40. A method of manufacturing on-demand lottery tickets comprising:

providing a lottery game server;

generating, by said lottery game server, a first set of lottery pool games;

providing at least one lottery game distribution controller, said lottery game distribution controller operatively coupled for communication with said lottery game server, said lottery game distribution controller further maintaining a second set of lottery pool games, said second set corresponding to and retrieving from said first set of lottery pool games;

providing at least one vending device, said vending device operatively coupled for communication with said lottery game distribution controller and further comprising blank lottery ticket media and a thermal printer, where said blank lottery ticket media further comprises printing media and an opaque cover removably attached to said printing media covering at least a portion of said printing media and being thermally conductive;

retrieving from said lottery game distribution controller ticket data corresponding to a purchase request originating from a vending device, said purchase request specifying at least one of said second set of lottery pool games, said ticket data comprising a ticket identification number and a game outcome;

generating a printed lottery ticket by printing, using said thermal printer, said ticket identification number and a game result indicia corresponding to said game outcome onto said printing media such that said game result indicia is underneath said opaque cover, said printing said game outcome further comprising printing through said opaque cover onto said printing media.

41. The method of claim 40, wherein said game outcome comprising an amount of a win.

42. The method of claim 40, wherein said game outcome comprises game symbols which may be compared against a pay table to determine an associated amount of a win.

43. The method of claim 40, further comprising printing a plurality of game outcome transactions on said printed lottery ticket, each of said game outcome transactions associated with a purchase request.

44. The method of claim 40, wherein said printed lottery ticket is further redeemable for a win amounts associated with said printed lottery ticket.

45. The method of claim 40, wherein said vending device further comprises a video display, said method further comprising displaying said game outcome of said printed lottery ticket via said video display.

46. The method of claim 45, wherein said displaying said game outcome is carried out during said printing of said printed lottery ticket.

47. The method of claim 45, further comprising reading said printed lottery ticket to determine said game outcome, said displaying said game outcome carried out after said reading said printed lottery ticket.

48. The method of claim 45, further comprising displaying on said display a win amount associated with said game outcome.

49. The method of claim 45, wherein said displaying said game outcome comprises:

animating spinning slot reels on said video display and stopping said animated spinning slot reels to indicate resulting game symbols corresponding to said game outcome along at least one payout line.

50. The method of claim 49, wherein said stopping said animated spinning slot reels is carried out after said printing is completed.

51. The method of claim 45, wherein said displaying said game outcome comprises displaying game symbols from one of: a poker hand, a keno game, or a bingo game.

52. The method of claim 40 where said at least one vending device further comprises at least one counter service station operable by an attendant for input of purchase requests, where said counter service station is operatively coupled for communication with said lottery game distribution controller and further comprising blank lottery ticket media and a thermal printer, where said blank lottery ticket media further comprises printing media and an opaque cover removably attached to said printing media covering at least a portion of said printing media and being thermally conductive.

53. An on-demand lottery ticket dispensable by a vending device, the vending device operatively coupled for communication with a centralized ticket manufacturing controller, the lottery ticket comprising:

thermal printing media;

a thermally conductive opaque cover removably attached to said printing media and covering at least a portion of said printing media, said opaque cover further attached to said thermal printing media via thermally conductive adhesive; and game result indicia printed on said printing media, said opaque cover covering said printed game result indicia, said outcome game result indicia provided by said centralized ticket manufacturing controller to said vending device pursuant to purchase of said lottery ticket.

54. The on-demand lottery ticket of claim 53, wherein said vending device is further associated with a game theme, said thermal laminate having game theme indicia thereon.

55. The on-demand lottery ticket of claim 53, wherein said cover further comprises a tab portion integral therein, said tab portion not attached to said thermal media.

* * * * *